US012698109B2

(12) United States Patent　　　(10) Patent No.: US 12,698,109 B2

Garuti et al.　　　　　　　　　(45) Date of Patent: Aug. 4, 2026

---

(54) VIRTUAL-PRESSURE BASED CONTROL SYSTEM AND METHOD FOR A FILLING MACHINE FLOW REGULATING VALVE

(71) Applicant: Tetra Laval Holdings & Finance S.A., Pully (CH)

(72) Inventors: Nicola Garuti, Scandiano (IT); Federica Villani, Formigine (IT); Fabio Bassissi, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 282 days.

(21) Appl. No.: 18/705,793

(22) PCT Filed: Oct. 25, 2022

(86) PCT No.: PCT/EP2022/079771

§ 371 (c)(1),
(2) Date: Apr. 29, 2024

(87) PCT Pub. No.: WO2023/072926

PCT Pub. Date: May 4, 2023

(65) Prior Publication Data

US 2026/0138765 A1　　May 21, 2026

(30) Foreign Application Priority Data

Oct. 29, 2021　(EP) ..................................... 21205645

(51) Int. Cl.
*B65B 3/26*　　　　(2006.01)
*B65B 9/20*　　　　(2012.01)
(Continued)

(52) U.S. Cl.
CPC .................. *B65B 3/26* (2013.01); *B65B 9/20* (2013.01); *B65B 57/145* (2013.01); *G05D 7/0635* (2013.01)

(58) Field of Classification Search
CPC ........... B65B 3/26; B65B 9/20; B65B 57/145; G05D 7/0635
See application file for complete search history.

(56) References Cited

U.S. PATENT DOCUMENTS

| | | | |
|---|---|---|---|
| 5,472,312 A | 12/1995 | Takeda et al. | |
| 6,684,609 B1 | 2/2004 | Bassissi et al. | |

(Continued)

FOREIGN PATENT DOCUMENTS

| | | |
|---|---|---|
| EP | 1053940 A1 | 11/2000 |
| EP | 0900345 B1 | 8/2007 |

(Continued)

OTHER PUBLICATIONS

International Search Report and Written Opinion received in PCT Application No. PCT/EP2022/079771 as mailed Feb. 17, 2023 in 9 pages.

*Primary Examiner* — Timothy L Maust

(74) *Attorney, Agent, or Firm* — Knobbe, Martens, Olson & Bear, LLP

(57) ABSTRACT

A method for controlling a flow regulating valve (6) of a filling machine (1) forming composite packages (2) from a multilayer composite packaging material and filling the composite packages with a pourable filling product, wherein a position of the regulating valve controls the flow of the product filling the packages, the method envisages: implementing a flow feedback control, receiving a flow set point ($F_{SP}$) and an inlet flow measurement ($F_{IN}$) and generating a feedback control contribution ($C_{FB}$) indicative of a difference between the inlet flow measurement and the flow set point; implementing a flow feed-forward control, receiving the flow set point ($F_{SP}$) and generating a feedforward control contribution ($C_{FF}$) using fluid-dynamic maps, which map an output position of the regulating valve with respect to flow and pressure values of the filling product; generating a (Continued)

virtual pressure ($P_V$) based on the feedback control contribution ($C_{FB}$) generated at the output of the flow feedback control module, wherein the flow feed-forward control receives the virtual pressure ($P_V$) and generates at its output the feedforward control contribution ($C_{FF}$) based on the flow set point ($F_{SP}$) and the virtual pressure ($P_V$) using the fluid-dynamic maps. The feedforward control contribution ($C_{FF}$) determines a control signal ($S_c$) for adjusting an operating position of the flow regulating valve (6).

15 Claims, 4 Drawing Sheets

(51) Int. Cl.
   *B65B 57/14*          (2006.01)
   *G05D 7/06*          (2006.01)

(56)                  References Cited

U.S. PATENT DOCUMENTS

|  |  |  |  |
|---|---|---|---|
| 7,313,901 | B2 | 1/2008 | Kakita et al. |
| 10,035,691 | B2 * | 7/2018 | Malmberg ............ B65B 39/001 |
| 10,082,806 | B2 | 9/2018 | Takijiri et al. |
| 12,428,178 | B2 * | 9/2025 | Villani ................. B65B 51/144 |
| 2002/0119249 | A1 | 8/2002 | Kevin |
| 2010/0180951 | A1 | 7/2010 | Smirnov |
| 2011/0054702 | A1 | 3/2011 | Smirnov et al. |
| 2016/0264392 | A1 | 9/2016 | Malmberg et al. |
| 2016/0297660 | A1 | 10/2016 | D'Errico et al. |
| 2020/0346911 | A1 | 11/2020 | D'Errico et al. |
| 2023/0244253 | A1 | 8/2023 | Bassissi et al. |

FOREIGN PATENT DOCUMENTS

| | | | | |
|---|---|---|---|---|
| EP | 3725689 | A1 * | 10/2020 | .......... B65H 23/192 |
| JP | S60-159916 | | 8/1985 | |
| JP | 2011-204265 | A | 10/2011 | |

* cited by examiner

VIRTUAL-PRESSURE BASED CONTROL SYSTEM AND METHOD FOR A FILLING MACHINE FLOW REGULATING VALVE

TECHNICAL FIELD

The present invention relates to a virtual-pressure based system and method for controlling a flow regulating valve in a filling machine for filling composite packages with a pourable food product.

BACKGROUND ART

As is known, many liquid or pourable food products, such as fruit juice, UHT (Ultra-High-Temperature treated) milk, wine, tomato sauce, etc., are distributed and marketed in composite packages made of a multilayer composite packaging material.

A typical example is the parallelepiped-shaped package for pourable food products known as Tetra Brik Aseptic™, which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Composite packages of this sort are normally produced within fully automatic filling (or, also denoted as, packaging) plants, which at least form the composite packages starting from a web of multilayer composite packaging material (wound from a reel) and fill the composite packages with the pourable food product.

A typical packaging plant comprises at least a filling machine, which forms the composite packages from the multilayer composite packaging material and fills the composite packages with the pourable food product. Additionally, packaging plants may also comprise downstream treatment equipment, receiving the composite packages from the filling machine and executing additional treatments on the composite packages; the downstream treatment equipment may for example comprise one or more of a buffer unit for temporarily buffering the composite packages; an application unit for applying e.g. straws on the composite packages; a grouping unit, e.g. a palletizer unit, for grouping a plurality of composite packages together in a storing unit (such as a pallet).

In a known filling machine, in particular a roll-fed filling machine used for filling liquid or pourable food products in multilayer composite packages, the liquid food product is fed into a tube, from which packages are formed, via a pipe; a regulating valve is used for regulating a flow of the liquid food product through the pipe, reaching the tube and filling the packages.

The filling machine comprises a control unit, which is operatively coupled to the regulating valve and configured to provide a control signal to the same regulating valve to modulate its opening/closing and thereby regulate the flow of liquid through the pipe and into the tube.

According to a known solution, the control unit is configured to implement a flow proportional-integral-derivative (PID) module, receiving at its input a flow set point and an inlet product flow measurement received from a flow meter sensor. An output of the flow PID module represents a first control corrective action based on a difference between a real flow, measured by means of the flow meter, and a desired flow, represented by the flow set point.

The control unit is further configured to implement a flow feed-forward (FF) module, receiving at its input the flow set point. The flow feed forward module generates at its output a second control corrective action as a function of the flow set point and of a nominal inlet pressure having a value fixed by design, using fluid-dynamic maps, which map the valve position with respect to the flow set point and pressure values.

The outputs of the flow proportional-integral-derivative (PID) module and of the flow feed-forward module (both indicative of a controlled position of the regulating valve) are combined in the control unit, to generate the control signal for the regulating valve, which is therefore adjusted as a function of the combined control actions.

European patent application No. 21180243 filed on Jun. 18, 2021 in the name of the present Applicant, discloses an advantageous and effective solution for controlling the regulating valve.

According to this solution, the filling machine further comprises a pressure sensor for determining an inlet pressure measurement of the liquid food product fed from the processing line towards the pipe, the pressure sensor being arranged upstream of the regulating valve, with respect to the direction flow of the liquid food product towards the pipe.

The inlet pressure measurement is provided to the control unit, as a further control parameter, in particular as an input of the flow feed-forward module.

As disclosed in the above mentioned patent application No. 21180243, use of the inlet pressure measurement as an input of the flow feed forward control module is particularly advantageous, since it allows to adjust the regulating valve also based on real-time pressure measurements from the processing line, so that the regulating valve can quickly adapt to pressure changes and fluctuations in the same processing line. For instance, in case of a pressure drop in the processing line due to product line disturbances, the regulating valve may be adjusted to compensate for this pressure drop.

In this regard, FIG. 1 shows exemplary plots related to the fluid-dynamic maps implemented in the flow feed-forward control module to determine the respective contribution to the controlled position of the flow regulating valve. The graphs plot the flow (in the y axis) versus the valve position (in the x axis), each graph referring to a different pressure value (in the example, denoted with $P_1$-$P_{11}$).

In particular, given the value of the flow set point, FIG. 1 shows the advantage of using the inlet pressure measurement provided by the pressure sensor instead of a nominal inlet pressure value (design value) to determine the position of the flow regulating valve, since the pressure measurement allows to determine the actual valve working point.

The present Applicant has realized that, although advantageous, alternative solutions might be preferred in certain occasions.

In particular, installing a pressure sensor along the processing line may not be possible for some filling machines, e.g. due to customer constraints, hardware and/or software limitations or any other reason, so that the control solution disclosed in the above mentioned patent application No. 21180243 cannot be implemented and the associated advantages cannot be reached. For example, physical constraints may be present in the machine that might render physically unpractical the introduction of a pressure sensor. In addition or in alternative, certain costumers might want to avoid the introduction of a pressure sensor because of economic reasons, e.g. because the component needs maintenance and/or substitution if it breaks.

A need is therefore felt for a solution for controlling the flow regulating valve, which allows to improve reaction to product line disturbances, while maintaining a current layout of the filling machines (i.e. without installing a pressure sensor along the processing line).

DISCLOSURE OF INVENTION

It is therefore an object of the present solution to provide an improved system and method for controlling the flow regulating valve, which allow to satisfy, at least in part, the above-mentioned need.

According to the present solution, a control method and system are therefore provided, as defined in the appended claims.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
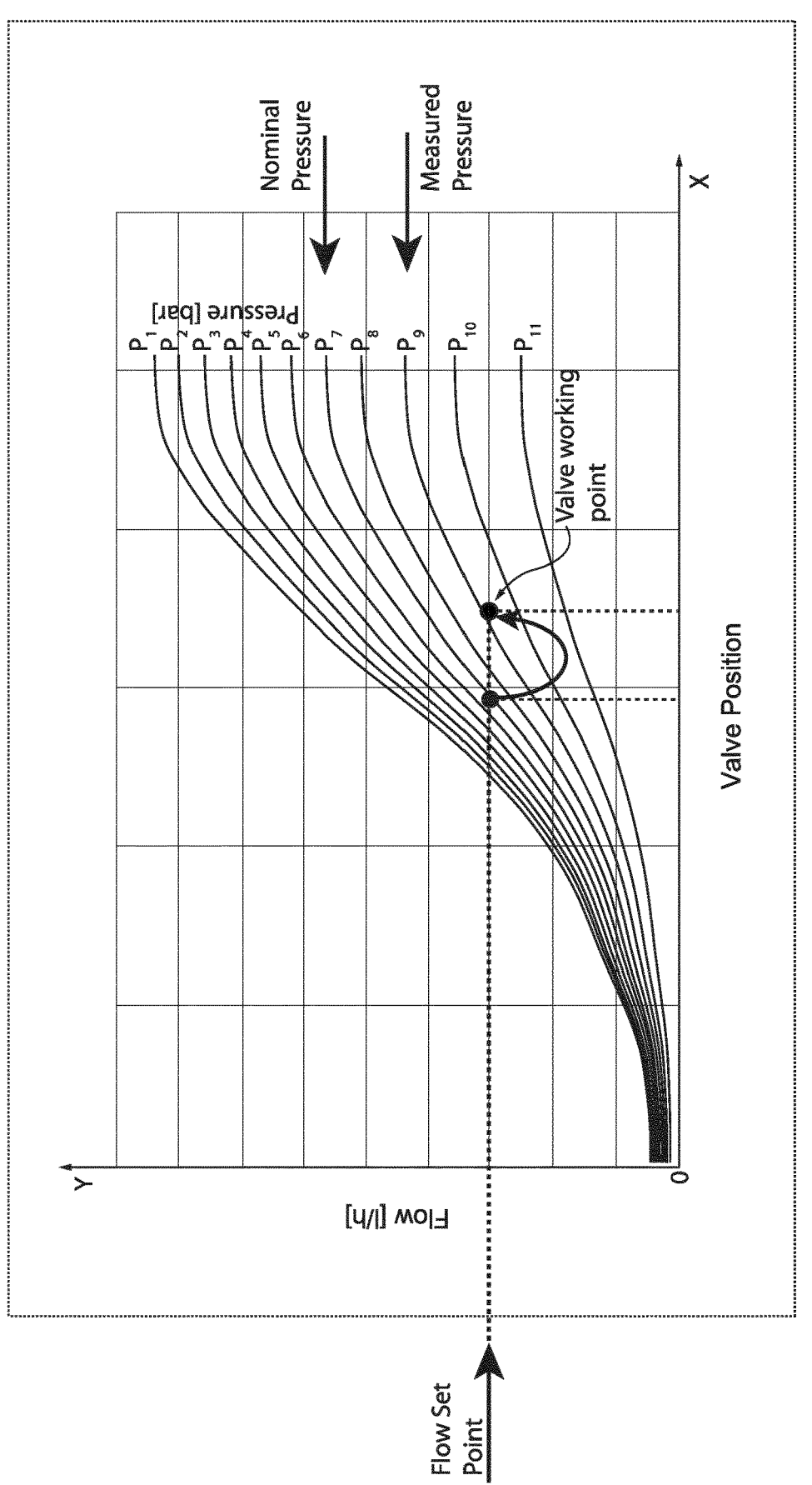
FIG. 1 shows plots of quantities related to the operation of a control unit of a filling machine, according to a known solution for controlling a flow regulating valve.
Figure 2:
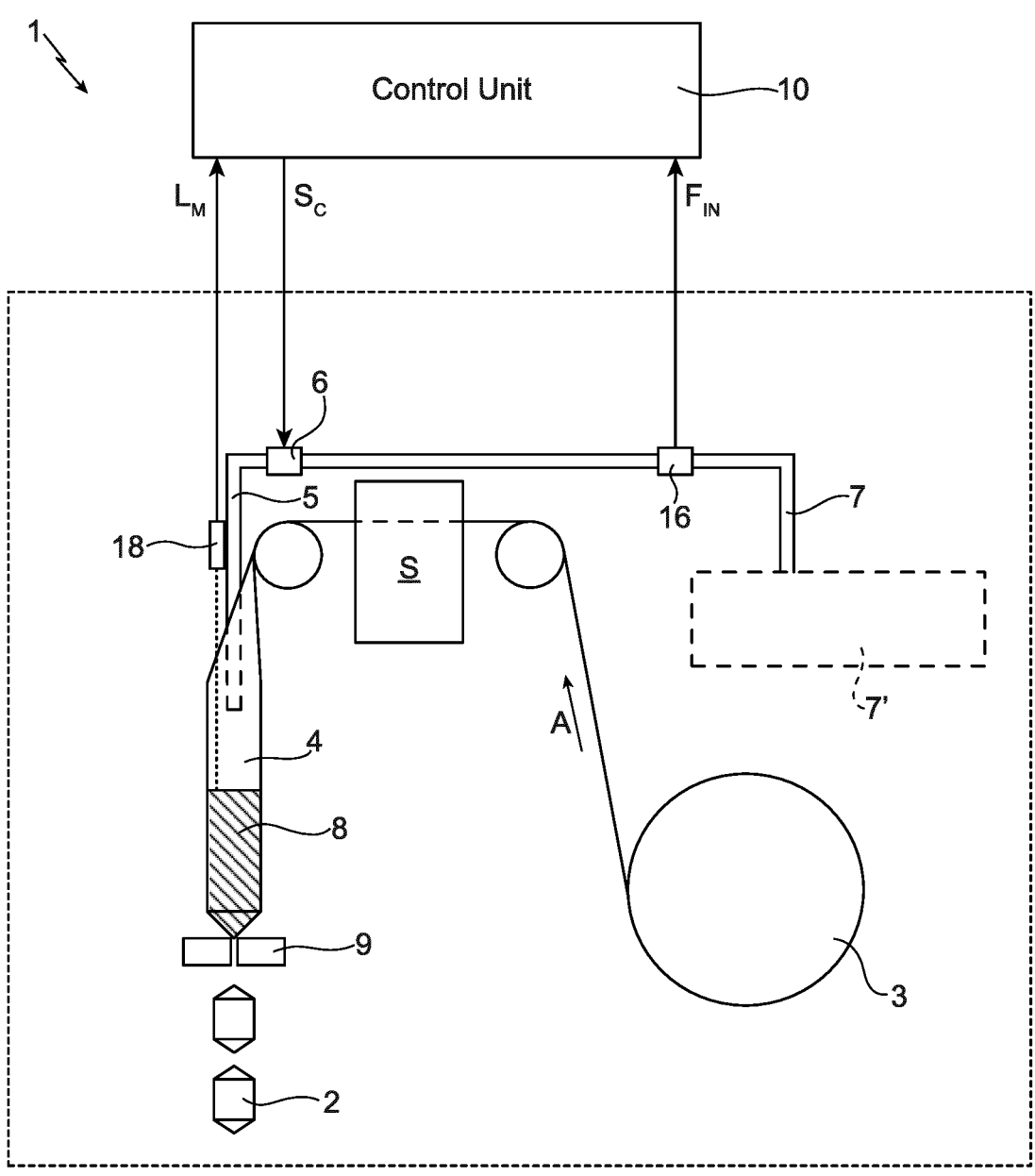
FIG. 2 is a schematic representation of a filling machine with the corresponding control unit.

FIG. 2 shows by way of example a filling machine 1, sometimes also referred to as a packaging machine, where the present control solution can be implemented; in the example, the filling machine 1 is a roll-fed filling machine used for filling liquid or pourable food products in multi-layer composite packages 2.

Multilayer composite packaging material may comprise at least a layer of fibrous material, such as e.g. a paper or cardboard layer, and at least two layers of heat-seal plastic material, e.g. polyethylene, interposing the layer of fibrous material in between one another. One of these two layers of heat-seal plastic material defines an inner face of the composite packages 2 eventually contacting the pourable food product packaged within the same composite packages 2.

Multilayer composite packaging material may also comprise a layer of gas- and light-barrier material, e.g. aluminum foil or ethylene vinyl alcohol (EVOH) film, in particular being arranged between one of the layers of the heat-seal plastic material and the layer of fibrous material. Preferentially, multilayer composite packaging material may also comprise a further layer of heat-seal plastic material being interposed between the layer of gas- and light-barrier material and the layer of fibrous material.

In particular, the multilayer composite packaging material is provided in the form of a web, in particular being wound up on a packaging material reel 3, from which it is fed through the filling machine 1 in a web feeding direction A; a tube 4 is formed in the filling machine 1 from the web by producing a longitudinal sealing.

The liquid food product is fed into the tube 4 via a pipe 5 and a regulating valve 6 is used for regulating a flow of the liquid food product through the pipe 5, reaching the tube 4 and filling the packages 2. In particular, the regulating valve 6 couples the pipe 5 to a processing line 7, which is configured to process (in any known manner) the liquid food product before its packaging (the processing line 7 being also coupled to a tank or similar storage element 7').

A lower end 8 of the tube 4 is fed into a folding device 9, in which a transversal sealing is produced, the tube 4 being folded according to folding lines, also referred to as weakening lines, and then cut off such that the composite packages 2 filled of the liquid food product are formed.

As shown in the same FIG. 2, the filling machine 1 can further comprise a sterilization device S, e.g. a hydrogen peroxide bath or an LVEB (Low-Voltage Electron Beam) station, for ensuring that the web is free from unwanted microorganisms, before the formation of the tube 4.

The filling machine 1 further comprises a control unit 10, which (in addition to other functions for managing general operation of the filling machine 1, here not discussed) is operatively coupled to the regulating valve 6 and configured to provide to the same regulating valve 6 a control signal $S_c$ to modulate its position (from a closed to an open position) and thereby regulate the flow of liquid through the pipe 5 and into the tube 4.

The control unit 10 for example includes a PLC (Programmable Logic Controller) or any suitable processing and computing unit, configured to execute a computer program designed to generate the above control signal $S_c$ for the regulating valve 6.

The filling machine 1 further comprises a flow meter 16 and a level detector 18.

The flow meter 16 determines an inlet product flow measurement $F_{IN}$ of the liquid food product fed from the processing line 7 to the filling machine 1; and the level detector 18 determines a product level measurement $L_M$ of the liquid food product that is fed from the pipe 5 into the tube 4 for filling of the packages 2.

The determined product flow and level measurements $F_{IN}$, $L_M$ are provided to the control unit 10, in a wired or wireless manner, as control parameters.

In particular, the flow meter 16 is arranged upstream of the regulating valve 6, with respect to the direction of flow of the liquid food product into the filling machine 1; and the level detector 18 is arranged in any suitable manner (e.g. in proximity of the tube 4), so as to detect the level of fluid inside the same tube 4 (e.g. in a non-contact manner, via an electromagnetic-type measurement).

It is noted that, in the proposed solution, the filling machine 1 does not require a pressure sensor for determining an inlet pressure measurement of the liquid food product fed from the processing line 7 towards the pipe 5; in other words, a pressure measurement is not a control parameter used by the control unit 10 to modulate the position of the regulating valve 6.

Figure 3:
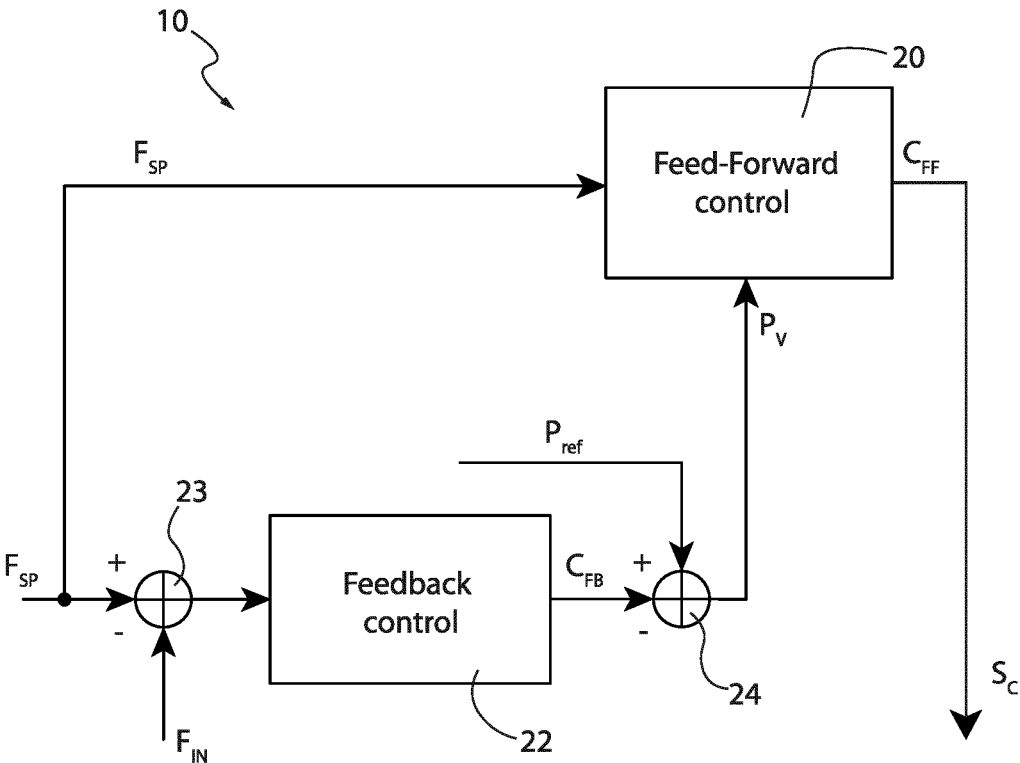
FIG. 3 is a schematic block diagram of the control unit of the filling machine, according to a possible embodiment.

FIG. 3 shows a schematic block diagram of the control unit 10, according to one or more embodiments of the present solution, which is configured to receive the inlet product flow measurement, $F_{IN}$, from the flow meter 16, and a flow set point $F_{SP}$.

The control unit 10 comprises a flow feed-forward (FF) control module 20 and a flow feedback (FB) control module 22, both receiving the flow set point $F_{SP}$ at a respective input.

The flow set point $F_{SP}$ is indicative of a target flow of product through the regulating valve 16 and into the pipe 5 towards the tube 4. The flow set point $F_{SP}$ may be determined as a function of one or more of a start flow percentage, a nominal flow percentage, a machine speed flow percentage, a level set point and/or a product level (as measured by level detector 18).

The flow feedback control module 22 further receives at its input the inlet product flow measurement $F_{IN}$ from the flow meter 16.

In a possible embodiment, the flow feedback control module 22 is implemented by a proportional-integral-derivative (PID) controller, which generates at its output a feedback control contribution $C_{FB}$, based on a difference between the flow set point $F_{SP}$ (representing a desired flow) and the inlet product flow measurement $F_{IN}$ measured by means of the flow meter 16 (representing a real flow), according to proportional, integrative and derivative control actions (in any known manner, here not discussed in detail). In other words, the above difference is indicative of a difference between the expected flow represented by the flow set point $F_{SP}$ and the real flow of product measured by means of the flow meter 16.

As shown in FIG. 3, the above difference between the flow set point $F_{SP}$ and the inlet product flow measurement $F_{IN}$ is performed in a first summing block 23, whose output is input to the flow feedback control module 22.

According to a particular aspect of the present solution, the flow feed-forward control module 20 receives at its input a virtual pressure, $P_V$, which is based on the feedback control contribution $C_{FB}$ generated at the output of the flow feedback control module 22.

The flow feed-forward control module 20 generates at its output a feedforward control contribution $C_{FF}$, based on the flow set point $F_{SP}$ and the above virtual pressure $P_V$, using fluid-dynamic maps, which provide a controlled position value of the regulating valve 6 based on the values of the flow set point $F_{SP}$ and of the virtual pressure $P_V$.

In particular, according to an aspect of the present solution, the feedforward control contribution $C_{FF}$ generated by the flow feed-forward control module 20 directly defines (in an exclusive and independent manner) the control signal $S_c$ for the flow regulating valve 6 of the filling machine 1, for modulating its opening/closing (the position of the valve ranging from a closed position to a fully open position) and thereby adjusting the flow of the liquid food product passing therethrough into the pipe 5 and then into the tube 4 for the formation of the filled packages 12.

Figure 4:
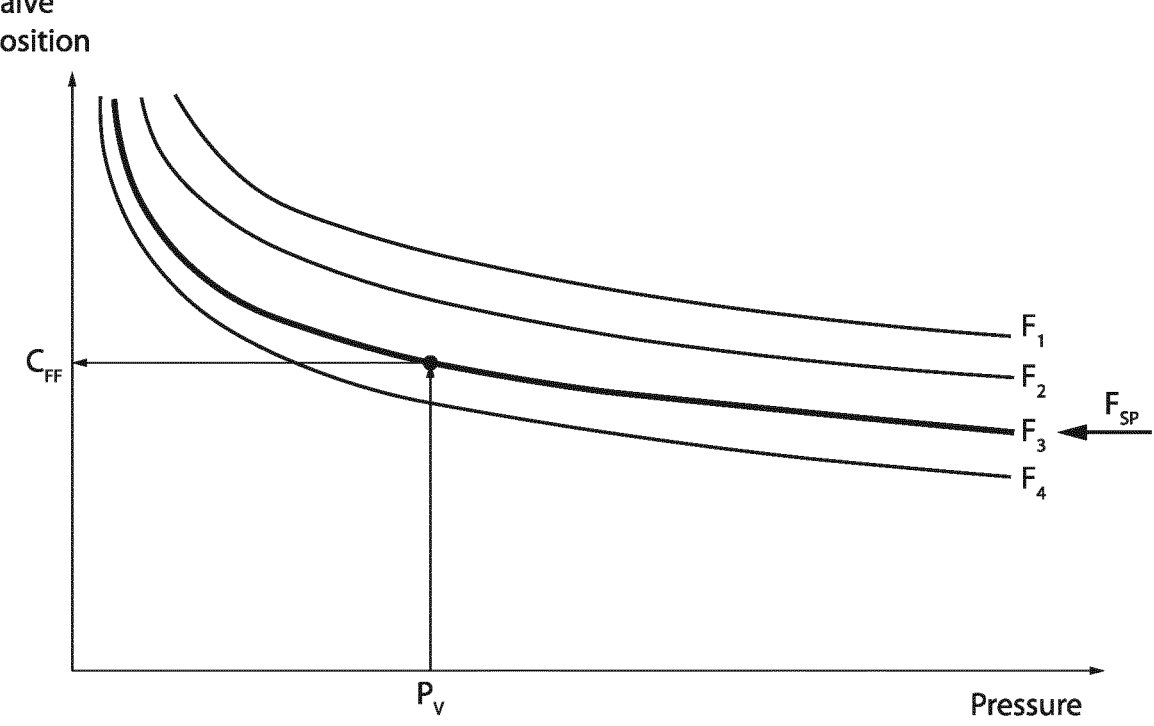
FIG. 4 shows plots of quantities related to the operation of the control unit of FIG. 3.

In this respect, FIG. 4 shows exemplary graphs of the fluid-dynamic map implemented in the flow feed-forward control module 20 to determine the feedforward control contribution $C_{FF}$ (i.e. the position of the regulating valve 6). In particular, the graphs plot the controlled valve position (in the y axis) versus the pressure drop (in the x axis), each graph referring to a different flow set point (in the example, denoted with $F_1$-$F_4$).

In particular, given the value of the flow set point $F_{SP}$, the value of the virtual pressure $P_V$ allows to determine the actual working point of the regulating valve 6 on the associated graph and the corresponding controlled position of the same flow regulating valve 6 (determining the control signal $S_c$).

In particular, the virtual pressure $P_V$ is determined as a function of the feedback control contribution $C_{FB}$ generated at the output of the flow feedback control module 22 and of a reference pressure value $P_{ref}$.

In more details, the value of the virtual pressure $P_V$ is determined as a difference between the reference pressure value $P_{ref}$ and the feedback control contribution $C_{FB}$, which is implemented in a second summing block 24. For example, the unit of measure of the feedback control contribution $C_{FB}$ may be the same of the reference pressure value $P_{ref}$.

According to a possible embodiment, the reference pressure value $P_{ref}$ corresponds to a maximum pressure value, which can be reached by the liquid food product, when fed from the processing line 7 towards the pipe 5 during operation of the filling machine 1. The maximum pressure value may be specific to the application and/or may vary with respect thereto.

Operation of the control unit 10 therefore exploits the direct proportionality relation between the flow and pressure variations in the filling fluid product, by computing an estimated value of the product pressure (the virtual pressure $P_V$) as a function of the flow feedback control loop.

The feedback control contribution $C_{FB}$ is indicative of a correction determined by the PID control loop to bring the measured flow (the inlet product flow measurement $F_{IN}$) to the flow set point $F_{SP}$; this same correction (due to the direct proportionality relation) may thus be applied to the reference pressure $P_{ref}$ to determine the virtual pressure $P_V$, representing an estimate indication of the filling product pressure e.g. at the regulating valve 6 (thereby avoiding the use of a dedicated pressure sensor to actually measure the product pressure).

Figure 5:
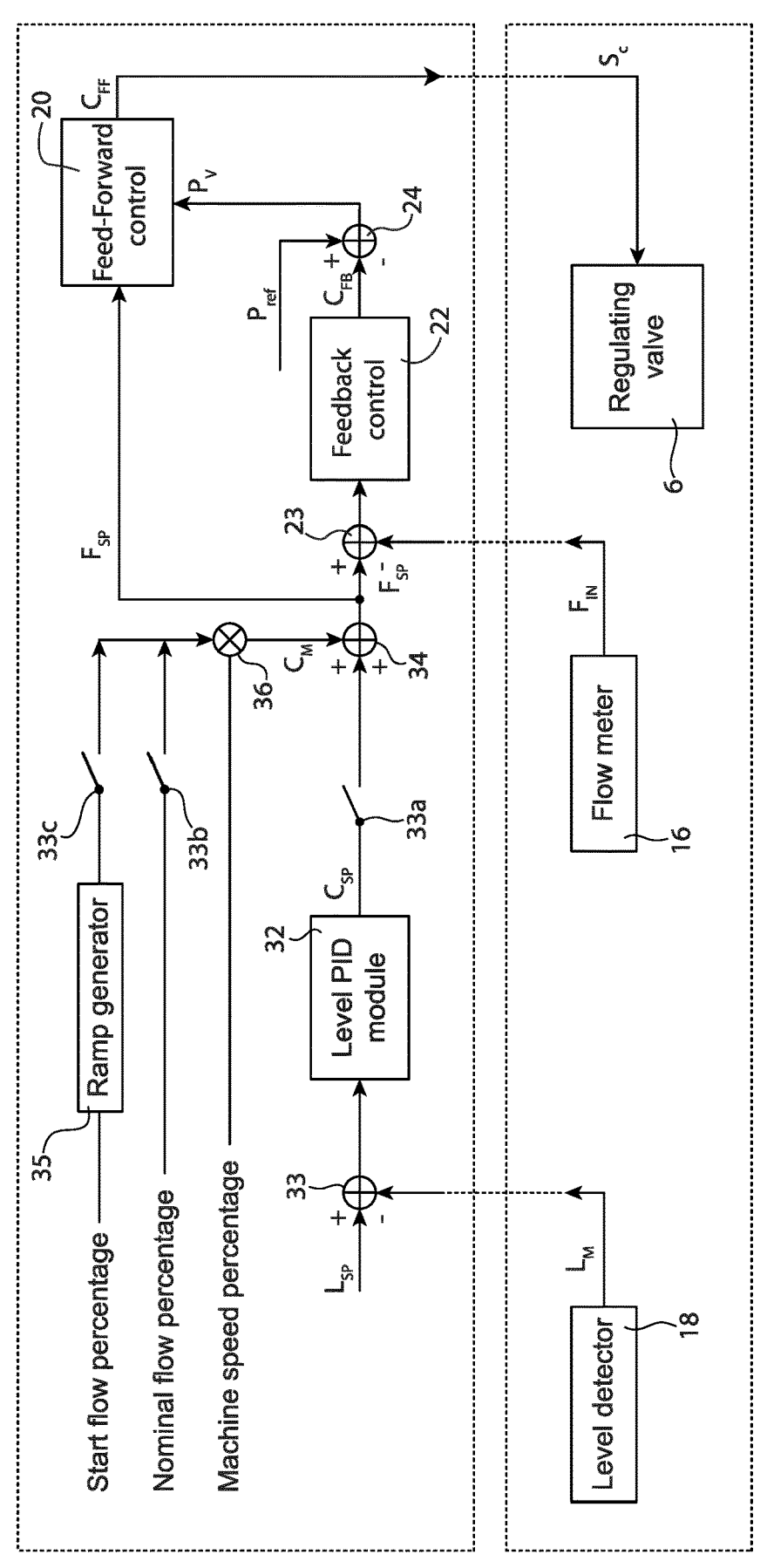
FIG. 5 is a schematic block diagram of the control unit of the filling machine according to one or more embodiments.

FIG. 5 shows a further embodiment of the control unit 10.

In this embodiment, the control unit 10 further comprises a level feedback control module 32, implemented by a respective proportional-integral-derivative (PID) controller, which generates at its output a further control contribution $C_{SP}$ indicative of the flow set point $F_{SP}$, based on a difference between the product level measurement $L_M$ received from the level detector 18 (representing a real product level) and a level set point $L_{SP}$ (representing a desired product level), according to proportional, integrative and derivative control actions (in any known manner, here not discussed in detail).

As shown in the same FIG. 5, the above difference between the product level measurement $L_M$ and the level set point $L_{SP}$ is performed in a third summing block 33, whose output represents the input of the level feedback control module 32.

The control unit 10 implements in this case a double PID control loop, based on the pressure and level measurements, in order to adjust the flow through the regulating valve 6 with an additional control action based on the product level (so as to achieve an even more stable operation of the filling machine 1).

The above further control contribution $C_{SP}$ may represent the actual flow set point $F_{SP}$, provided at the input of the flow feedback control module 22.

In the embodiment shown in FIG. 5, the further control contribution $C_{SP}$ is selectively provided, via a first switch 33a, to a summing block 34, which generates at the output the flow set point $F_{SP}$ and further receives at the input a machine flow contribution $C_M$.

In particular, this machine flow contribution $C_M$ is generated by a multiplier block 36, which receives at its inputs: a machine speed percentage; and, selectively, either a nominal flow percentage (via a second switch 33b), or a start flow percentage (via a ramp generator 35 and a third switch 33c).

In a known manner, the machine flow contribution $C_M$ may represent a contribution to the flow set point $F_{SP}$ at the start of the filling machine 1.

The advantages of the discussed solution are clear from the foregoing description.

In any case, it is underlined that the improved control action implemented by the control unit 10 allows to provide a more accurate response of the regulating valve 6, by compensating instantaneous flow (and pressure) fluctuations and disturbances.

A more stable operation of the filling machine 1 can therefore be achieved, with a more stable level and flow of the product in the filled packages, reducing waste of product and of the same packages in the presence of product line disturbances.

Advantageously, the above improvements are achieved without additional components being required along the product processing line. In particular, no pressure sensor is needed to provide a measurement of the inlet product pressure, since an indication of the same product pressure is achieved by estimation of the virtual pressure $P_V$ based on the output of the flow feedback control loop.

Clearly, changes may be made to what described herein without, however, departing from the scope of protection as defined in the accompanying claims.

In particular, it is underlined that the discussed solution may be applied for any packaging or filling machine and for any kind of pourable food product.

The invention claimed is:

1. A method for controlling a flow regulating valve of a filling machine configured to form composite packages from a multilayer composite packaging material and to fill the composite packages with a pourable filling product, wherein a position of the regulating valve adjusts the flow of the product filling the packages, the method comprising:

implementing a flow feedback control, receiving a flow set point and an inlet flow measurement of the filling product from a flow meter and generating a feedback control contribution based on a difference between the inlet flow measurement and the flow set point;

implementing a flow feed-forward control, receiving the flow set point and generating a feed-forward control contribution using fluid-dynamic maps mapping an output position of the regulating valve with respect to flow and pressure of the filling product;

generating a virtual pressure based on the feedback control contribution at the output of the flow feedback control module;

receiving, in the flow feed-forward control, the virtual pressure, and generating at its output the feedforward control contribution based on the flow set point and the virtual pressure using the fluid-dynamic maps; and generating a control signal for controlling an operating position of the flow regulating valve from the feedforward control contribution.

2. The method according to claim 1, wherein the virtual pressure is an estimate indication of the pressure of the filling product.

3. The method according to claim 1, comprising determining the virtual pressure as a function of the feedback control contribution at the output of the flow feedback control module and of a reference pressure value.

4. The method according to claim 3, comprising determining the virtual pressure as a difference between the reference pressure value and the feedback control contribution.

5. The method according to claim 3, wherein the reference pressure value corresponds to a maximum pressure value, which can be reached by the filling product during operation of the filling machine.

6. The method according to claim 1, wherein the fluid dynamics maps provide the operating position of the flow regulating valve from the values of the virtual pressure and flow set point.

7. The method according to claim 1, wherein the flow set point is indicative of a target flow of product through the regulating valve, determined as a function of one or more of: a start flow percentage, a nominal flow percentage, a machine speed flow percentage, a level set point and a product level measured by a level detector.

8. The method according to claim 1, wherein the flow feedback control is implemented by a proportional-integral-derivative, PID, module.

9. The method according to claim 1, further comprising:

receiving a product level measurement from a level detector;

determining a further control contribution by a proportional-integral-derivative control, based on a difference between the product level measurement and a level set point; and wherein the flow set point is a function of said control contribution.

10. The method according to claim 1, wherein the filling machine is configured to form a tube from a web of the multilayer composite packaging material and comprises a filling pipe for filling the tube with the filling product; the regulating valve being configured to couple the filling pipe to a product processing line.

11. A control system for controlling a flow regulating valve of a filling machine configured to form composite packages from a multilayer composite packaging material and to fill the composite packages with a pourable filling product, wherein the regulating valve is configured to adjust the flow of the product filling the packages, the control system comprising:

a control unit configured to determine a control signal for controlling an operating position the flow regulating valve, and wherein the control unit is configured to implement the method according to claim 1.

12. A filling machine, comprising the control system, according to claim 11.

13. The filling machine according to claim 12, configured to form a tube from a web of the multilayer composite packaging material and comprising a filling pipe for filling the tube with the filling product, wherein the regulating valve is configured to couple the filling pipe to a product processing line.

14. The filling machine according to claim 13, wherein the flow meter is arranged upstream of the regulating valve with respect to a direction of flow of said filling product from the processing line to the filling pipe.

15. The filling machine according to claim 12, wherein the control unit does not receive a product pressure measurement as a control parameter to determine the control signal.

* * * * *